US012668204B2

(12) United States Patent
Dahlquist et al.

(10) Patent No.: US 12,668,204 B2
(45) Date of Patent: Jun. 30, 2026

(54) LOAD-BEARING BELT RETRACTOR

(71) Applicant: AUTOLIV DEVELOPMENT AB, Vargarda (SE)

(72) Inventors: Bengt Dahlquist, Alingsås (SE); Arndt Söhnchen, Hamburg (DE); Lennart Pettersson, Bankeryd (SE); Ronald Jabusch, Elmshorn (DE); Hans-Jörg Langhoff, Bönningstedt (DE); Antto-Christian Glässer, Hasloh (DE); Alexandru Cirstea, Elmshorn (DE); Jens Ehlers, Horst (DE)

(73) Assignee: Autoliv Development AB, Vargarda (SE)

( * ) Notice: Subject to any disclaimer, the term of this patent is extended or adjusted under 35 U.S.C. 154(b) by 199 days.

(21) Appl. No.: 18/279,746

(22) PCT Filed: Feb. 24, 2022

(86) PCT No.: PCT/EP2022/054609
§ 371 (c)(1),
(2) Date: Sep. 1, 2023

(87) PCT Pub. No.: WO2022/184535
PCT Pub. Date: Sep. 9, 2022

(65) Prior Publication Data
US 2024/0140354 A1 May 2, 2024

(30) Foreign Application Priority Data
Mar. 2, 2021 (DE) ..................... 10 2021 105 013.8

(51) Int. Cl.
*B60R 22/34* (2006.01)
*B60N 2/68* (2006.01)
*B60R 22/26* (2006.01)

(52) U.S. Cl.
CPC ...... *B60R 22/34* (2013.01); *B60R 2022/3402* (2013.01)

(58) Field of Classification Search
CPC ......... B60N 2/688; B60R 22/26; B60R 22/34; B60R 2022/3402
(Continued)

(56) References Cited

U.S. PATENT DOCUMENTS 5,362,132 A * 11/1994 Griswold ............... B60N 2/688
297/483
5,934,760 A * 8/1999 Schroth ................... B60R 22/26
297/483
(Continued)

FOREIGN PATENT DOCUMENTS

CN 109131206 A * 1/2019 ............ B60R 22/34
CN 116940484 A * 10/2023 ............ B60N 2/688
(Continued)

*Primary Examiner* — Ryan D Kwiecinski
(74) *Attorney, Agent, or Firm* — Dickinson Wright PLLC

(57) ABSTRACT

The invention relates to a load-bearing seat belt retractor for a seat structure of a vehicle seat. The seat belt retractor has two housing halves, between which functional modules of the seat belt retractor are arranged. One functional module is a belt spool with a winding axis, wherein a plurality of support plates oriented perpendicularly to the winding axis is provided on the functional modules, each said support plate having at least two locking noses, and the locking noses engage into corresponding locking holes in the two housing halves. The housing halves have beads and/or reinforcements directed toward the functional modules, and at least one section of a functional module and/or a section of a support plate is supported against the beads and/or reinforcements in at least one direction parallel to the winding axis.

15 Claims, 3 Drawing Sheets

Figure 1:
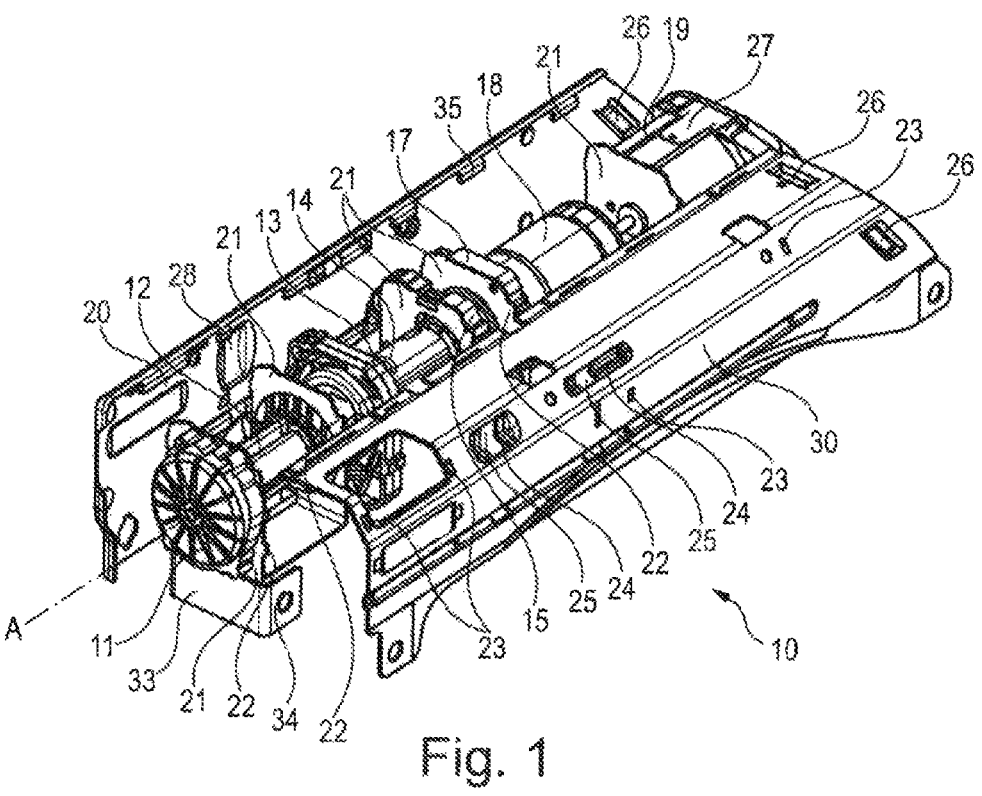

(58) Field of Classification Search
USPC ........................................................ 297/483
See application file for complete search history.

(56) References Cited

U.S. PATENT DOCUMENTS

| | | | | |
|---|---|---|---|---|
| 6,139,111 | A * | 10/2000 | Pywell | B60N 2/809 |
| | | | | 297/216.13 |
| 6,293,588 | B1 * | 9/2001 | Clune | B60R 22/02 |
| | | | | 297/483 |
| 6,682,009 | B1 * | 1/2004 | Frank | B60R 22/3413 |
| | | | | 242/379.1 |
| 6,811,186 | B1 * | 11/2004 | Fraley | B60R 22/20 |
| | | | | 297/483 |
| 10,870,410 | B2 * | 12/2020 | Jabusch | B60N 2/688 |
| 11,577,687 | B2 * | 2/2023 | Jabusch | B60R 22/3413 |
| 11,866,000 | B2 * | 1/2024 | Jabusch | B60R 22/3413 |
| 11,945,398 | B2 * | 4/2024 | Muehlenbrock | B60N 2/688 |
| 12,168,416 | B2 * | 12/2024 | Glaesser | B60R 22/4633 |
| 2002/0125701 | A1 * | 9/2002 | Devonport | B60R 21/18 |
| | | | | 280/733 |
| 2003/0116668 | A1 * | 6/2003 | Sumiyashiki | B60R 22/415 |
| | | | | 242/384.6 |
| 2003/0160498 | A1 * | 8/2003 | Boelstler | B60R 22/26 |
| | | | | 297/483 |
| 2012/0199686 | A1 * | 8/2012 | Muto | B60R 22/34 |
| | | | | 242/539 |
| 2013/0299665 | A1 * | 11/2013 | Suess | B60N 2/0722 |
| | | | | 248/429 |
| 2013/0327874 | A1 * | 12/2013 | Jessup | B29C 65/7443 |
| | | | | 242/379 |
| 2016/0221534 | A1 * | 8/2016 | Asako | B60R 22/46 |
| 2018/0334065 | A1 * | 11/2018 | Suzuki | B60N 2/68 |
| 2019/0193674 | A1 * | 6/2019 | Fukawatase | B60R 22/44 |
| 2020/0047710 | A1 * | 2/2020 | Jabusch | B60R 22/4628 |
| 2020/0047711 | A1 * | 2/2020 | Jabusch | B60R 22/46 |
| 2020/0130641 | A1 * | 4/2020 | Jabusch | B60R 22/46 |
| 2021/0387593 | A1 * | 12/2021 | Jabusch | B60R 22/44 |
| 2021/0394706 | A1 * | 12/2021 | Muehlenbrock | B60N 2/682 |
| 2022/0266792 | A1 * | 8/2022 | Glaesser | B60R 22/4633 |
| 2023/0001882 | A1 * | 1/2023 | Jabusch | B60R 22/3413 |

| | | | | |
|---|---|---|---|---|
| 2023/0234533 | A1 * | 7/2023 | Jabusch | B60R 22/46 |
| | | | | 242/396.2 |
| 2023/0256933 | A1 * | 8/2023 | Söhnchen | B60R 22/46 |
| | | | | 242/390.9 |
| 2024/0010162 | A1 * | 1/2024 | Watanabe | B60R 22/46 |
| 2024/0051495 | A1 * | 2/2024 | Söhnchen | B60R 22/26 |
| 2024/0075859 | A1 * | 3/2024 | Murase | B60N 2/688 |
| 2024/0140354 | A1 * | 5/2024 | Dahlquist | B60R 22/26 |
| 2024/0308462 | A1 * | 9/2024 | Mazour | B60R 22/34 |
| 2024/0308463 | A1 * | 9/2024 | Söhnchen | B60R 22/26 |
| 2025/0042354 | A1 * | 2/2025 | Andrina | B60R 22/347 |
| 2025/0065839 | A1 * | 2/2025 | Dahlquist | B60R 22/34 |

FOREIGN PATENT DOCUMENTS

| | | | | | |
|---|---|---|---|---|---|
| DE | 3331272 | A * | 3/1984 | | B60R 22/34 |
| DE | 3402245 | A * | 7/1985 | | B60R 22/34 |
| DE | 10239740 | A1 * | 3/2004 | | B60R 22/34 |
| DE | 102018213279 | A1 * | 2/2020 | | B60R 22/26 |
| DE | 102019205307 | A1 * | 10/2020 | | B60R 22/26 |
| DE | 102019114926 | A1 * | 12/2020 | | B60R 22/44 |
| DE | 102019211852 | B3 * | 12/2020 | | B60R 22/4633 |
| DE | 102021105010 | A1 * | 9/2022 | | B60R 22/34 |
| DE | 102021105013 | A1 * | 9/2022 | | B60R 22/34 |
| DE | 102022132183 | A1 * | 6/2024 | | B60R 22/26 |
| DE | 102022132184 | A1 * | 6/2024 | | B60R 22/26 |
| DE | 102023104728 | A1 * | 8/2024 | | B60R 22/023 |
| DE | 102023110547 | A1 * | 10/2024 | | B60R 21/0134 |
| EP | 3098118 | A2 * | 11/2016 | | B60R 22/3413 |
| EP | 3643563 | A1 * | 4/2020 | | B60N 2/688 |
| FR | 2747631 | A1 * | 10/1997 | | B60R 22/26 |
| FR | 3089179 | A1 * | 6/2020 | | B60R 22/34 |
| GB | 2386831 | A * | 10/2003 | | B60N 2/829 |
| JP | 2010269733 | A * | 12/2010 | | B60N 2/688 |
| JP | 2023177521 | A * | 12/2023 | | B60N 2/688 |
| WO | WO-2012119060 | A2 * | 9/2012 | | B60R 22/34 |
| WO | WO-2020030685 | A1 * | 2/2020 | | B60R 22/4628 |
| WO | WO-2020030739 | A1 * | 2/2020 | | B60N 2/688 |
| WO | WO-2020083706 | A1 * | 4/2020 | | B60R 22/26 |
| WO | WO-2021023538 | A1 * | 2/2021 | | B60R 22/4633 |
| WO | WO-2025028767 | A1 * | 2/2025 | | B60N 2/42 |

* cited by examiner

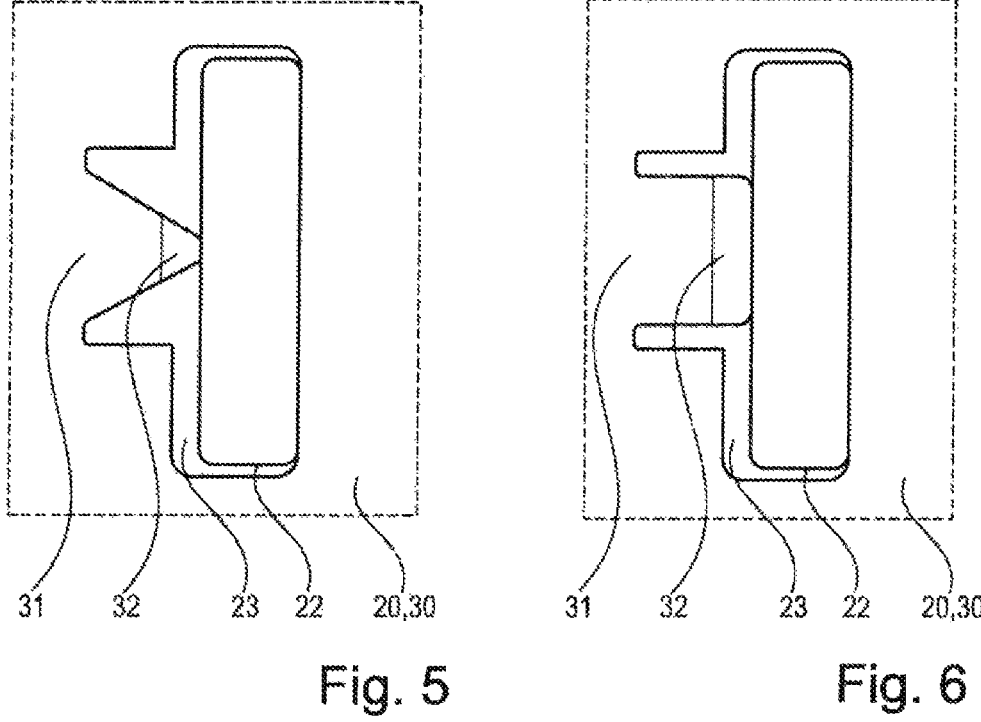
Fig. 5                          Fig. 6
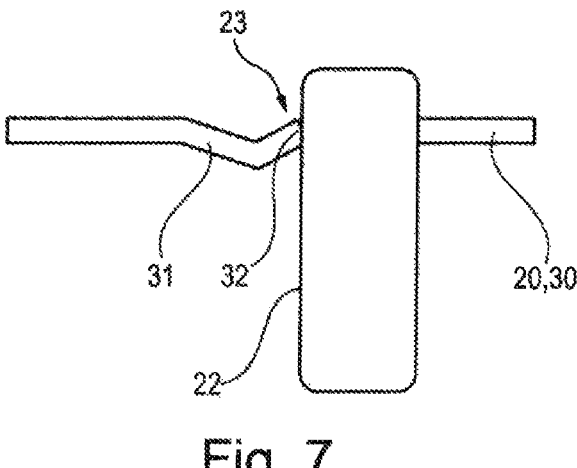
Fig. 7

LOAD-BEARING BELT RETRACTOR

The present invention relates to a load-bearing seat belt retractor for a seat structure of a vehicle seat, having the features of the preamble of claim 1.

Vehicle seats having integrated safety belt devices are known, for example, in the use as front seats in convertibles, in which at least the belt retractors of the safety belt devices are fastened in the backrests of the vehicle seats. In this case, due to the lack of a load-bearing B-pillar and for reasons relating to access to the rear seats or for reasons relating to distance from the rear vehicle structure, the belt retractors are preferably integrated into the backrests of the vehicle seats, which must therefore also be designed to absorb the tensile forces acting in the case of restraint. The belt retractors themselves are identical in their basic structure to standard belt retractors and are equipped only with various additional subassemblies provided especially for installation in the backrests, such as a self-aligning inertia sensor.

In its basic design, a vehicle seat has a seat structure consisting of several load-bearing structural parts, which serve to fasten the vehicle seat to the vehicle structure. The seat structure is equipped with springs and cushioning in order to improve sitting comfort and is also used for the fastening of further components, such as various seat adjustment mechanisms, including the associated electric motors and further components, such as heating devices, sensors, displays, headrests and the like.

In modern vehicles with autonomous driving systems, there is an increasing demand for greater adjustability of vehicle seats in various orientations and positions in such a manner that the vehicle occupant can use the freedom obtained by autonomous driving, for example, for more meaningful communication with the other occupants, for extended and more intensive rest phases or even for work, and can orient the vehicle seat accordingly. As a result, the safety belt device, and in particular the belt retractor, has to be fastened not as before to the vehicle structure but rather to the vehicle seat, as has already been the case, for example, with the front seats of convertibles.

A load-bearing structural part for a vehicle seat in which a seat belt retractor is arranged is known, for example, from DE 10 2018 213 279 A1.

Against this background, the object of the invention is to specify an improved, dimensionally stable and crash-resistant seat belt retractor for a seat structure, the seat belt retractor making simple assembly possible.

In order to achieve the object, a load-bearing seat belt retractor having the features of claim 1 is proposed. Further preferred developments of the invention can be taken from the dependent claims, the figures and the associated description.

According to the basic idea of the invention, a load-bearing seat belt retractor for a seat structure of a vehicle seat is proposed according to claim 1, the seat belt retractor having two housing halves, between which functional modules of the seat belt retractor are arranged. One of the functional modules is a belt spool with a winding axis, and a plurality of support plates oriented perpendicularly to the winding axis is provided on the functional modules, each of said support plates having at least two locking noses, the locking noses engaging in corresponding locking holes in the two housing halves. It is proposed that the housing halves have beads and/or reinforcements directed toward the functional modules, the functional modules and/or the support plates being supported on the beads and/or reinforcements in at least one direction parallel to the winding axis.

The beads and reinforcements in the housing halves take up loads parallel to the winding axis of the belt spool due to the support of the functional modules and/or the support plates and enable greater force transmission in this direction than locking noses. The locking noses are thereby relieved of load, and this increases the load-bearing capacity for further load cases. In this way, a simple and cost-effective possibility for positioning and fixing functional modules in the seat belt retractor can also be achieved, and at the same time the stiffness of the housing part or of the seat belt retractor can be increased.

In this context, load-bearing means that, in addition to the introduction of forces from the seat belt into a seat structure, the seat belt retractor can also absorb and transfer loads of the seat structure itself. The seat belt retractor is therefore suitable as a load-bearing structural part of a superordinate seat structure.

One functional module of a seat belt retractor is, in particular, a belt spool with a seat belt that can be wound thereon to form a belt winding. Another functional module is in particular a blocking device.

A functional module can be a reversible belt tensioner, an irreversible belt tensioner, a force-limiting device, a sensor device or even a control device. Furthermore, a functional module can be an electric motor which can be provided for various functions in the seat belt retractor.

The functional modules of the seat belt retractor, which are arranged between the two housing halves, are preferably arranged coaxially or axially and in series with the belt spool. This results in a space-saving construction in a narrow elongate installation space, and thus the seat belt retractor can easily be arranged in the backrest of a vehicle seat. With respect to the longitudinal direction of the axis of rotation of the belt spool, the functional modules are arranged behind or in front of the belt spool. The other functional modules in addition to the belt spool can be arranged axially in series, i.e., one behind the other, with respect to the axis of rotation of the belt spool such that they possibly only slightly project beyond the belt winding toward the outside and the elongate design of the seat belt retractor is continued and further extended.

The support plates can support one or more functional modules of the seat belt retractor, and the support plates can be arranged between the functional modules or can be part of a functional module or part of a housing of a functional module. The support plates can also be used to stiffen the load-bearing seat belt retractor. The support plates enable in particular an elongate shape of the seat belt retractor with functional modules arranged in series. The support plates are preferably oriented with their surface normals parallel to the axis of rotation of the belt shaft or to the winding axis.

The locking holes in the housing halves can also be referred to as position holes, since the locking holes enable the predefined positioning of the functional modules during assembly and in normal operation and also in the case of restraint. Locking holes can, for example, be punched out of sheet metal or cut out by means of a laser.

In a preferred embodiment, two seat bars extending parallel to and at a distance from one another can be inserted into the seat belt retractor along an insertion axis and fastened. The two housing halves of the seat belt retractor extend preferably over the entire width of the seat belt retractor. The housing halves can each at least partially surround two seat bars, which form the lateral seat structure of a backrest of a vehicle seat on both sides. The two housing halves preferably form two receptacles in the seat belt retractor, into which receptacles two seat bars can be inserted. This in turn means that, in an assembly process, the seat belt retractor can be fitted onto the seat bars of a backrest in a simple manner. In advantageous embodiments, through-holes are provided in the housing halves, which through-holes further enable simple fastening of seat bars by means of a screw connection. The formed receptacles for the seat bars enable force transmission and/or torque transmission in the directions different from the insertion direction, so that forces can be transmitted via large contact surfaces between the seat bars and the housing halves of the seat belt retractor. Therefore, stress peaks and the load on the screw connection can be reduced. Overall, a stiff, stable and at the same time easy connection can be achieved as a result.

In an advantageous embodiment, the beads and/or reinforcements are formed by channel-like reinforcements on which a functional module or a section of the support plate is supported, parallel to the winding axis, on one side or two sides. The channel-like reinforcements can be introduced into a metal sheet in a cost-effective manner, for example by forming and/or stamping processes.

According to a further development, it is proposed that at least one housing part has a closed bead which is stamped toward the functional modules and which has a cutout, a section of a functional module being supported in the cutout of the bead.

The shape of a closed bead enables a high stiffness if, for example, the cutout is arranged in the center of the bead, so that the bead divided into two parts by the cutout continues to be stable. The cutout enables precise positioning of the section of a functional module that is supported therein. In addition, it can be achieved by means of the cutout that the support can take place in two opposite directions, in particular in both directions along the axis of rotation of the belt shaft or along the winding axis of the belt spool. The combination of the cutout in the closed bead is also advantageous with respect to the assembly procedure, since the assembly of the housing halves or the functional modules is thereby simplified by virtue of a type of pre-alignment of the functional module or the support plate in the bead in relation to the cutout.

According to a further development, it is proposed that at least one locking hole in a housing part has a fixing tongue. A fixing tongue enables the fixing of a locking nose inserted in the locking hole by virtue of the spring-loaded deformation of the fixing tongue. The fixing tongue preferably protrudes in the locking hole to such an extent that the wall thickness of the locking nose of the support plate causes deformation of the fixing tongue as the locking nose engages in the locking hole. This enables simple fixing during the mounting, which simplifies the mounting of the functional modules themselves and reduces the influence of manufacturing tolerances.

It is further proposed that the fixing tongue is oriented parallel to the winding axis, the tongue end of the fixing tongue being directed away from the belt spool functional module.

Furthermore, it is proposed that the two housing halves have a plurality of locking holes which each have a fixing tongue, the tongue ends of all the fixing tongues in the locking holes of the two housing halves being oriented in the same direction, preferably directed away from the belt spool functional module.

Thus, the fixed locking noses or the support plates can be mounted in relation to a functional module as a base. The plurality of locking holes can be provided for different functional modules and/or support plates. In one possible embodiment, the fixing tongue is therefore directed parallel to the winding axis and with the tongue end toward the motor or electric motor functional module as a base. An electric motor as a functional module can advantageously be mounted at the end of an axial or coaxial arrangement; the electric motor can be positioned at the other end opposite from a belt spool in the seat belt retractor. In addition to the plurality of locking holes with fixing tongues, other locking holes without fixing tongues can also be provided in the two housing halves.

In an advantageous embodiment, the fixing tongue has a constant width. A large fixing effect can thus be achieved. The width of the tongue is preferably smaller than the width of the locking nose. Furthermore, the mounting forces and the achievable fixing effect can be adjusted inter alia by the width of the locking nose and the oversize of the tongue.

According to a further development, it is proposed that a functional module has tabs extending parallel to the winding axis, the housing halves each having at least one open bead, into which the tabs of the functional module are inserted.

This allows the functional module to be fixed in position in several axes, while at the same time there is simple mounting by insertion of the functional module into the two housing halves, which can also, for example, simplify the mounting of other functional modules between the two housing halves. In possible embodiments, the tabs of the functional module can be oriented parallel to the winding axis of the belt spool and inserted into corresponding open beads of the two housing parts.

A motor module or an electric motor as a functional module with tabs is particularly well suited because the motor module is generally arranged at the end of a coaxial line-up of functional modules, which facilitates assembly. The functional module that is generally provided at the other end of a coaxial arrangement is the belt spool, which, by virtue of its function, is less suitable for the arrangement of correspondingly oriented tabs due to the provided belt winding.

In one possible embodiment, at least one housing part can have tabs extending parallel to the winding axis, which are inserted into corresponding open beads of a functional module, which is preferably a motor module or an electric motor.

In another advantageous embodiment, the fixing tongue has a width which tapers toward the tongue end. As a result, the initial resistance during assembly can be reduced.

According to a further development, it is proposed that a section of a functional module is supported parallel to the winding axis on both sides in at least one closed bead of a housing part, said at least one closed bead being stamped away from the functional module. This can also simplify the assembly of the housing halves with the functional modules by virtue of a type of pre-alignment of the functional module in question and/or, optionally, of a corresponding support plate.

This is advantageous in particular when the functional module has a pyrotechnic tensioner wheel, so that the loads that occur when the pyrotechnic tensioner is triggered can be absorbed over a surface by a housing part.

In an advantageous embodiment, at least one bead and/or reinforcement is formed by a rib oriented perpendicularly to the winding axis. This enables simple support of a functional module and/or a support plate independently of locking noses. In particular if the bead and/or reinforcement is stamped away from the functional module, a functional module can be supported parallel to the winding axis on both sides.

In an advantageous embodiment, the seat belt retractor has a functional module on which a C-shaped clip is arranged, two legs of the C-shaped clip being seated against the inside of the two housing halves, respectively, and a seat bar being able to be inserted into the clip and fastened to the clip and to the two housing halves.

Each leg of the clip therefore preferably forms a contact surface for contact with a housing part. Furthermore, the clip forms, preferably on, in particular under, the belt spool functional module, the receptacle into which a seat bar can be inserted. The two housing halves of the seat belt retractor enclose the C-shaped clip preferably from several sides. In this way the functional modules, in particular the belt spool functional module, can directly introduce forces into an inserted and fastened seat bar. In particular in the case of restraint, this enables a direct force transmission between a blocked belt spool and the further seat structure, which is connected to a vehicle.

In advantageous embodiments, through-holes are provided in the clip in correspondence with the through-holes in the housing halves, which further enable simple fastening of a seat bar by means of a screw connection.

According to a further development, it is proposed that one housing part is designed with an L-shaped contour. The housing part can be fastened to two parallel and spaced-apart seat bars.

The L-shaped contour, which preferably extends parallel to the winding axis of the belt spool, has a positive effect on the stiffness of the seat belt retractor and can be produced in a simple manner from sheet metal. The bend between the two legs of the L-shaped contour, which are preferably essentially at a right angle to one another, can also be accomplished by two bend lines, for example.

The L-shaped contour of one housing part makes it possible, in particular, to insert a functional module with two tabs into an open bead on each leg of the L-shaped contour, whereby the fastening of the functional module in the housing is further improved.

It is further proposed that one housing part is designed as a cover-shaped contour, with an overall height of less than 15 mm.

The housing part with the cover-shaped contour is essentially flat and extends over the entire width of the seat belt retractor. Together with the housing part having an L-shaped contour, a U-shaped contour is preferably formed, in which the functional modules are arranged. The U-shaped contour is open in the direction in which seat bars are intended to be received, i.e., the housing of the seat belt retractor is open at the bottom a typical case in which the seat belt retractor is installed at the upper end of a backrest of a vehicle seat.

The housing part with the L-shaped contour and the housing part with the cover-shaped contour can be produced, for example, from sheet metal by means of punching and forming.

According to a further development, it is proposed that the two housing halves are directly connected by an insertion connection with tongues and corresponding slots.

Force transmission between the two housing halves in a plurality of axes over a comparatively long contact region, in particular along the width of the seat belt retractor, can thereby be achieved in a simple manner. The tongues and slots can be produced cost-effectively using conventional sheet metal processing methods.

In a possible advantageous embodiment, the tongues are oriented parallel to the insertion axis of the seat bars. This enables a good form-locking connection of the two housing halves in all directions different from the insertion axis.

Furthermore, a seat structure of a vehicle seat is proposed, the seat structure having two seat bars extending parallel to and at a distance from one another in a backrest of the vehicle seat. The seat bars are inserted into a proposed load-bearing seat belt retractor and fastened to the seat belt retractor.

The seat belt retractor is therefore load-bearing as a structural cross-strut between the vertical seat bars of the backrest.

According to a further development, it is proposed that the two seat bars are fastened to the seat belt retractor by means of one screw each, the screw being fed through a through-hole in the seat bar and in the two housing halves.

In this way, simple, stable and cost-effective fastening of the seat belt retractor to the seat bars can be achieved. Furthermore, it is proposed that a C-shaped clip of a functional module is arranged between the housing halves and at least one seat bar, the C-shaped clip having a corresponding through-hole for fastening with a screw together with the two housing halves and a seat bar.

Figures 3, 4:
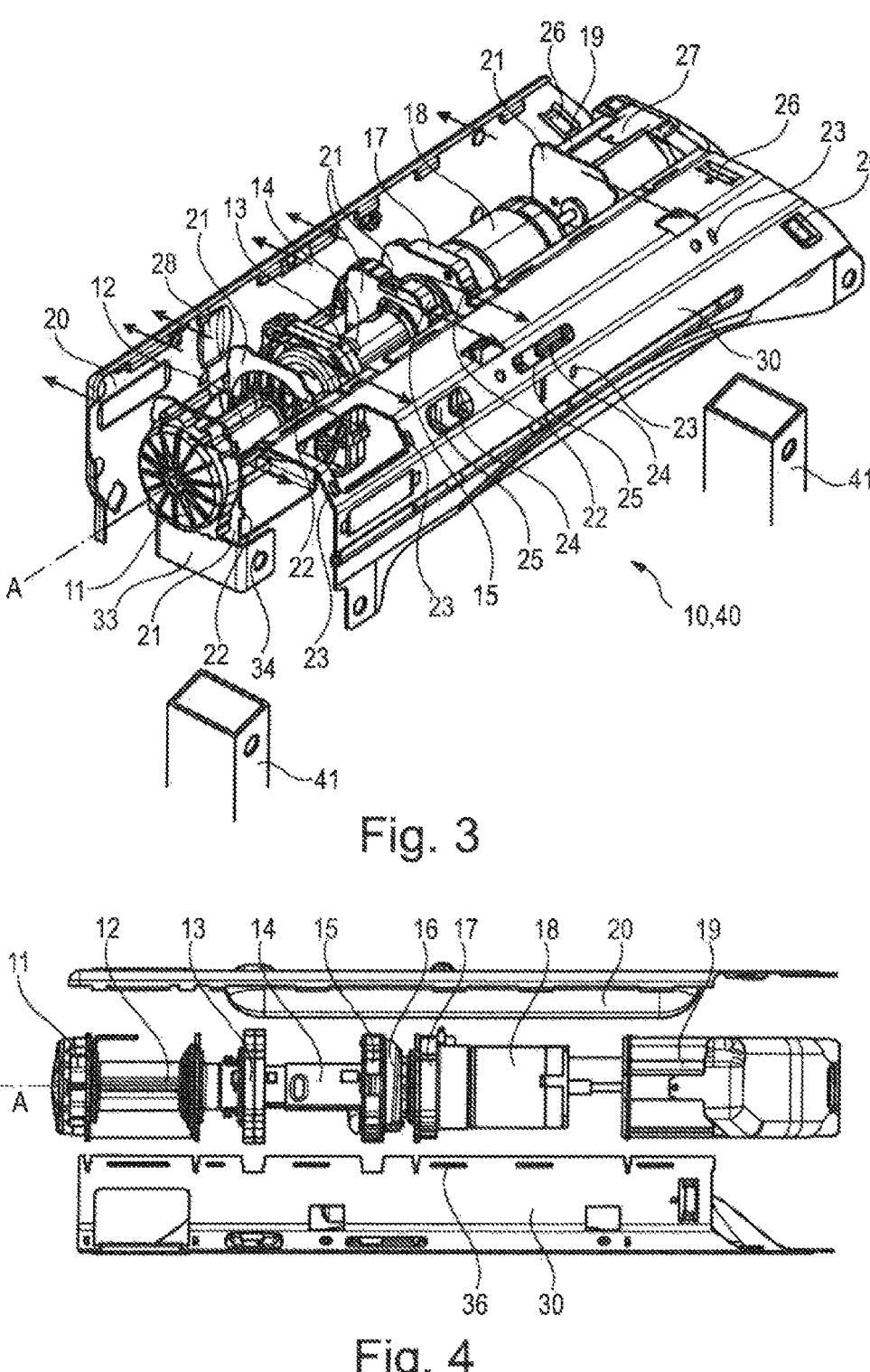

The invention is explained below using preferred embodiments with reference to the accompanying figures. The following are shown:

FIG. 1a load-bearing seat belt retractor in an exploded view;

FIG. 2a load-bearing seat belt retractor in an exploded view from the rear;

FIG. 3a load-bearing seat belt retractor with seat bars in an exploded view;

FIG. 4 a load-bearing seat belt retractor in an exploded view from above;

FIG. 5a locking hole with fixing tongue and inserted locking nose;

FIG. 6a locking hole with another fixing tongue and inserted locking nose;

FIG. 7a locking hole with fixing tongue and inserted locking nose in a side view.

FIG. 1 shows an exemplary embodiment of a load-bearing seat belt retractor 10 in an exploded view. The seat belt retractor 10 has a plurality of functional modules 11, 12, 13, 14, 15, 16, 17, 18, 19, which are constructed one behind the other in a stacked arrangement. This results in an elongate design which allows the seat belt retractor to be arranged in the upper part of a backrest of a vehicle seat. The functional modules 11, 12, 13, 14, 15, 16, 17, 18, 19 are, for example, a belt spool 12 for a seat belt (not shown) on which a drive spring 11 is provided. The belt spool 12 has a winding axis A, about which a seat belt can be wound to form a belt winding. Furthermore, a tensioner drive wheel 13 is provided, with which a pyrotechnic belt tensioning can be achieved. A force-limiting apparatus 14 (LLA) is arranged next to an associated switching device 15. A profile head 16 with a blocking pawl is provided axially next to a frame 17 with toothing for blocking the blocking pawl. Furthermore, for example a transmission 18, in particular a planetary transmission 18, can be provided axially, on which transmission a motor 19, in particular an electric motor, is provided.

Several functional modules have support plates 21, which are integral or are mounted between two functional modules and which support the functional modules in a housing formed essentially of two housing halves 20, 30. The two housing halves 20, 30 are each arranged laterally with respect to the winding axis A and enclose the functional modules 11, 12, 13, 14, 15, 16, 17, 18, 19 so that they are held and supported in the two housing halves 20, 30. The housing halves 20, 30 supplement each other at least in sections to form a fully closed profile, which allows the functional modules to be supported over their entire periphery.

The support plates 21 have a plurality of locking noses 22 which, in the assembled state, engage in locking holes 23 provided in the two housing halves 20, 30 and fix the support plate 21 in question axially along the winding axis A. The support plate 21 can be supported by means of its peripheral edges in directions perpendicular to the winding axis A on housing inner sides of the housing parts 20, 30.

Figure 2:
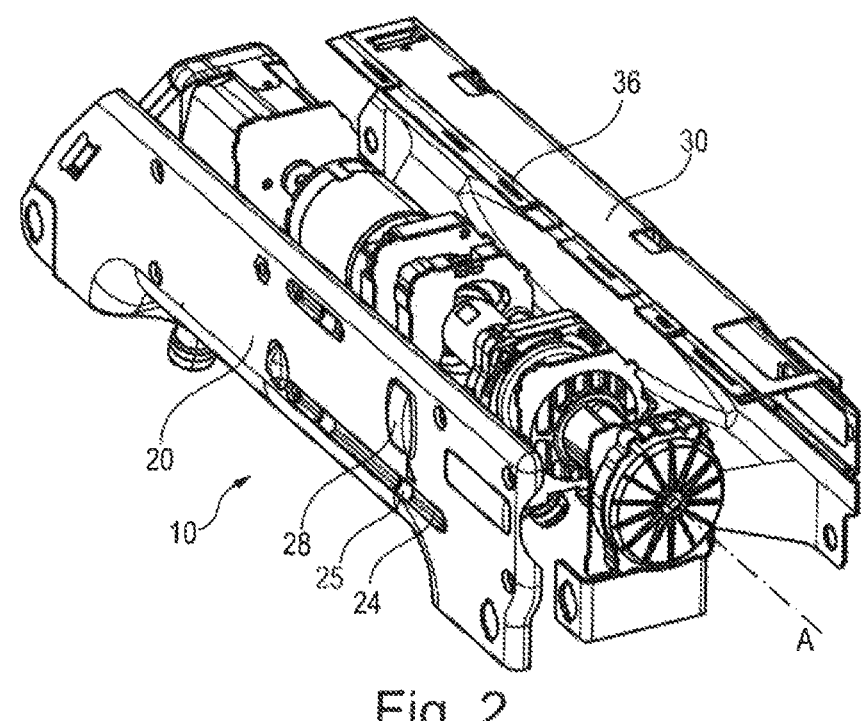

In addition to the locking holes 23 for fixing the functional modules 11, 12, 13, 14, 15, 16, 17, 18, 19, the two housing halves 20, 30 have beads 24 which are shaped inward, i.e., toward the functional elements, and which form reinforcements which are channel-like when observed from the outside; see also FIG. 2. The inwardly shaped beads 24 can have cutouts 25, in which a section or part of a functional module 13, 15 is supported in the two directions parallel to the winding axis A. These beads 24 are, for example, oriented parallel to the winding axis A in the manner of a channel. Furthermore, these beads 24 are closed beads 24 which have no opening or punch-out at their axial ends. At the same time, the beads 24 serve as reinforcement of the respective housing halves 20, 30.

Furthermore, a closed bead 28 oriented perpendicularly to the winding axis A is provided on one of the housing halves 20. The bead 28 is formed outward, i.e., away from the functional modules or the functional module. A functional module 13 can be supported in the bead 28 in both directions along the winding axis A and also transversely to the winding axis A.

Three tabs 27 which are oriented parallel to the winding axis A and which point toward the belt spool 12 are provided on the motor functional module 19. These tabs 27 are inserted into three corresponding open beads 26 which are provided on the two housing halves 20, 30.

The belt spool 12 comprises a C-shaped clip 33 which is mounted on the frame of the belt spool 12 and/or on a support plate 21 of the belt spool 12. The clip 33 has two legs 34, which are seated against the housing inner side of the housing halves 20, 30, respectively. In possible exemplary embodiments, the functional module 19 on the other side of the seat belt retractor 10 can likewise have a corresponding C-shaped clip 33.

The housing halves 20, 30 can be connected by form-locking engagement, by means of insertion connections of tongues 35 and corresponding slots 36 on the other housing half 20, 30. As can be seen in the illustrations in the figures, this form-locking engagement preferably takes place on the top of the seat belt retractor 10.

One housing half 30 is L-shaped or has an L-shaped contour, which in this exemplary embodiment has, in the region of the belt spool 12, an opening for a seat belt (not shown). The other housing half 20 is designed as a cover or as a cover-shaped contour and is therefore basically flatter than the housing half 30 with the two legs of the L-shaped contour.

FIG. 3 shows the load-bearing seat belt retractor 10 with parts of a seat structure 40 in the form of two seat bars 41 of a backrest of a vehicle seat. The seat belt retractor 10 is fitted onto the seat bars 41 from above and perpendicularly to the winding axis A and, by the use of corresponding through-holes, can be screwed to said seat bars, the seat belt retractor 10 thus forming a load-bearing element of the seat structure 40. The C-shaped clip 33 or the clips 33 are arranged between the housing inner sides of the two housing halves 20, 30 and a seat bar 41 and are screwed together with them.

FIGS. 5 and 6 show locking holes 23 in a top view in a housing half 20, 30, into which a locking nose 22 is inserted. In the two exemplary embodiments, fixing tongues 31 are provided, which press against the locking nose 22, the locking nose 22 thus being pressed against the opposite edge of the locking hole 23. The locking nose 22 on the support plate is thus secured in the direction of pull-out from the locking hole 23, which simplifies the assembly and prevents rattling noises. In particular, a tolerance compensation during the mounting of the axially stacked functional modules 11, 12, 13, 14, 15, 16, 17, 18, 19 can be achieved by means of the fixing tongues 31 in the locking holes 23. In an advantageous exemplary embodiment, all locking holes 23 point in a direction which points toward the functional module 19 at the other end opposite from the belt spool 12, so that a tolerance compensation with respect to a base can take place.

The locking tongue 31 in the exemplary embodiment of FIG. 5 tapers toward the contact with the locking nose 22, so that the fixing tongue 31 is significantly narrower at the tongue end 32 than the base of the locking tongue 31. FIG. 6 shows a locking tongue 31 with a constant width.

FIG. 7 shows a sectional view of the exemplary embodiments of FIGS. 5 and 6, in which sectional view the deflection and deformation of the fixing tongue 31, which effects the pressing of the tongue end 32 of the fixing tongue 31 onto the locking nose 22.

In particular, the fixing tongues 31 are oriented uniformly in such a way that they force all the functional modules 11, 12, 13, 14, 15, 16, 17, 18, 19 in the same direction to form a compact design. In the present exemplary embodiment, this is the direction toward the electric motor 19 fixed at the end of the seat belt retractor.

The switching device 15 for the force-limiting device 14 comprises here a comparatively wide plastic plate with a width of approximately 2 cm and can thus be oriented particularly well at an angle between the two housing halves 20, 30 due to this width. In addition, after the orienting the switching device 15 can be fixed in the oriented position by means of screws. The screwing is preferably performed from the outside.

The invention claimed is:

1. A load-bearing belt retractor for a seat structure of a vehicle seat, wherein
    the belt retractor has two housing halves, between which are arranged functional modules of the belt retractor, wherein
    one functional module is a belt spool having a winding axis,
    a plurality of support plates oriented perpendicularly to the winding axis is provided on the functional modules, each of said support plates having at least two locking noses, the locking noses engaging in corresponding locking holes in the two housing halves, the support plates being mounted on the functional modules and distinct from the housing halves, wherein
    the housing halves have beads and/or reinforcements directed toward the functional modules, at least one section of a functional module and/or one section of a support plate being supported on the beads and/or reinforcements in at least one direction parallel to the winding axis.

2. A seat belt retractor according to claim 1, wherein in that the beads and/or reinforcements are formed by channel-like reinforcements on which the functional module or section of the support plate is supported, parallel to the winding axis, on one or two sides.

3. A seat belt retractor according to claim 1, wherein in that at least one of the housing halves has a closed bead which is stamped toward the functional modules and which has a cutout, a section of the functional module being supported in the cutout of the bead.

4. A seat belt retractor according to claim 1, wherein in that at least one of the locking holes has a fixing tongue.

5. A seat belt retractor according to claim 4, wherein in that the fixing tongue is oriented parallel to the winding axis, a tongue end of the fixing tongue being directed away from the belt spool functional module.

6. A seat belt retractor according to claim 4, wherein in that the two housing halves have a plurality of locking holes which each have a fixing tongue with a tongue end, the tongue ends of all the fixing tongues in the locking holes of the two housing halves being oriented in the same direction.

7. A seat belt retractor according to claim 4, wherein in that the fixing tongue (31) has a constant width.

8. A seat belt retractor according to claim 4, wherein in that the fixing tongue has a width which tapers toward the tongue end.

9. A seat belt retractor according to claim 1, wherein in that the functional module has tabs extending parallel to the winding axis, the housing halves each having at least one open bead, into which the tabs of the functional module are inserted.

10. A seat belt retractor according to claim 1, wherein in that a section of the functional module is supported on both sides in at least one closed bead of at one of the housing halves, said at least one closed bead being stamped away from the functional module.

11. A seat belt retractor according to claim 1, wherein in that at least one of the beads and/or reinforcements is formed by a rib oriented perpendicularly to the winding axis.

12. A seat belt retractor according to claim 1, wherein in that the seat belt retractor includes the functional module on which a C-shaped clip is arranged, two legs of the C-shaped clip being seated against the inside of the two housing halves, respectively, and a seat bar being able to be inserted into the clip and to be fastened to the clip and to the two housing halves.

13. A seat belt retractor according to claim 1, wherein in that one of the housing halves is designed with an L-shaped contour.

14. A seat belt retractor according to claim 1, wherein in that one of the housing halves is designed as a cover-shaped contour, with an overall height of less than 15 mm.

15. A seat belt retractor according to claim 1, wherein in that the two housing halves are directly connected by an insertion connection with tongues and corresponding slots.

* * * * *